United States Patent [19]

Jankowski

[11] 4,285,628

[45] Aug. 25, 1981

[54] GRAPPLE SYSTEM

[75] Inventor: Edward M. Jankowski, Sioux Falls, S. Dak.

[73] Assignee: Du-Al Manufacturing Company, Division of Core Industries, Inc., Sioux Falls, S. Dak.

[21] Appl. No.: 79,508

[22] Filed: Sep. 27, 1979

[51] Int. Cl.³ ............................................... B66C 1/00
[52] U.S. Cl. ................................... 414/739; 37/117.5; 414/607
[58] Field of Search ............... 414/704, 724, 739, 715, 414/723, 731, 732, 738, 607; 37/117.5, DIG. 3

[56] References Cited

U.S. PATENT DOCUMENTS 3,451,575   6/1969   Petro .................................... 414/704

OTHER PUBLICATIONS

Photo of Farm-Hand Loader F27.
Leon publication.
Westendorf pub. "Monster Grab Fork".
Du-Al pub. "3100 Loader", Du-Al Mfg. Co., Souix Falls, S.D.
Arts-Way pub. "Loaders", Arts-Way Mfg. Co., Armstrong, Iowa.
GB Line pub. "Specialized Loaders Attachment", Aug. 16, 1974.
Ezee-On pub. "Grapple Fork Model 601-841", Aug. 16, 1974.

*Primary Examiner*—Robert B. Reeves
*Assistant Examiner*—Douglas D. Watts
*Attorney, Agent, or Firm*—Hill, Van Santen, Steadman, Chiara & Simpson

[57] ABSTRACT

A grapple system is disclosed for mounting on the bucket of a tractor. A grapple tooth frame is provided having a plurality of grapple teeth extending in fork-like fashion from a pivot tube. A linkage housing is also provided which contains first and second series connected linkages with a hydraulic extension member pivotally connected between the linkages. The free end of one of the linkages is connected to a first fixed point and the free end of the other linkage connects to a crank arm on the grapple tooth frame. The free end of the hydraulic member connects to a second fixed point in the linkage housing. The linkage housing connects to the grapple tooth frame via the pivot tube. When the grapple teeth are in an upward or open position, the linkage connecting directly to the crank arm is approaching an in-line configuration with the hydraulic member. In a closed or load engaging position of the teeth, the two linkages are approaching an in-line configuration. Preferably, ends of the grapple teeth are adjustable for selectively different types of load engagement. The grapple system easily mounts on the tractor bucket by a pocket member engaging the bucket at an upper edge thereof and a single positioning pin.

13 Claims, 3 Drawing Figures

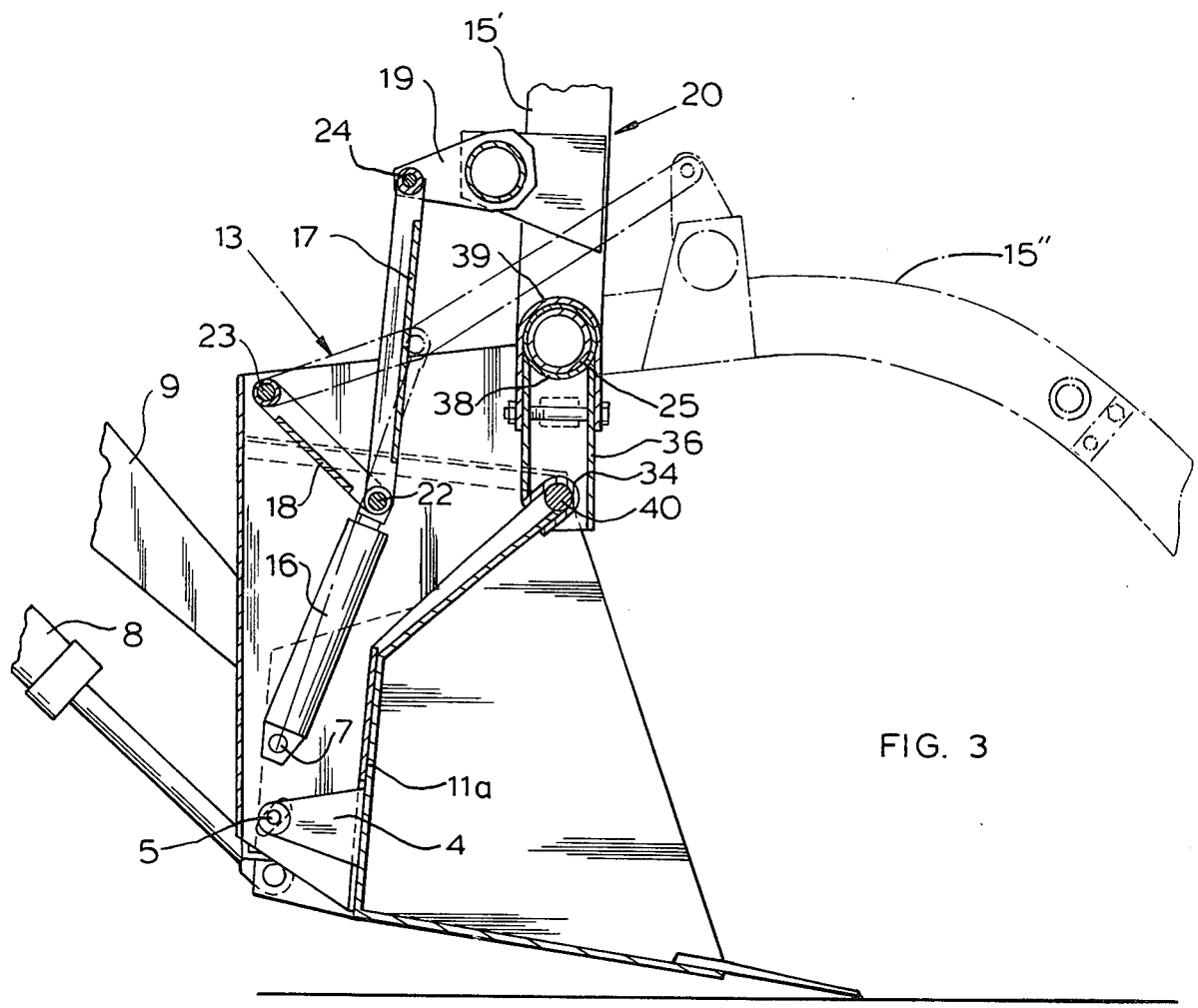
FIG. 3
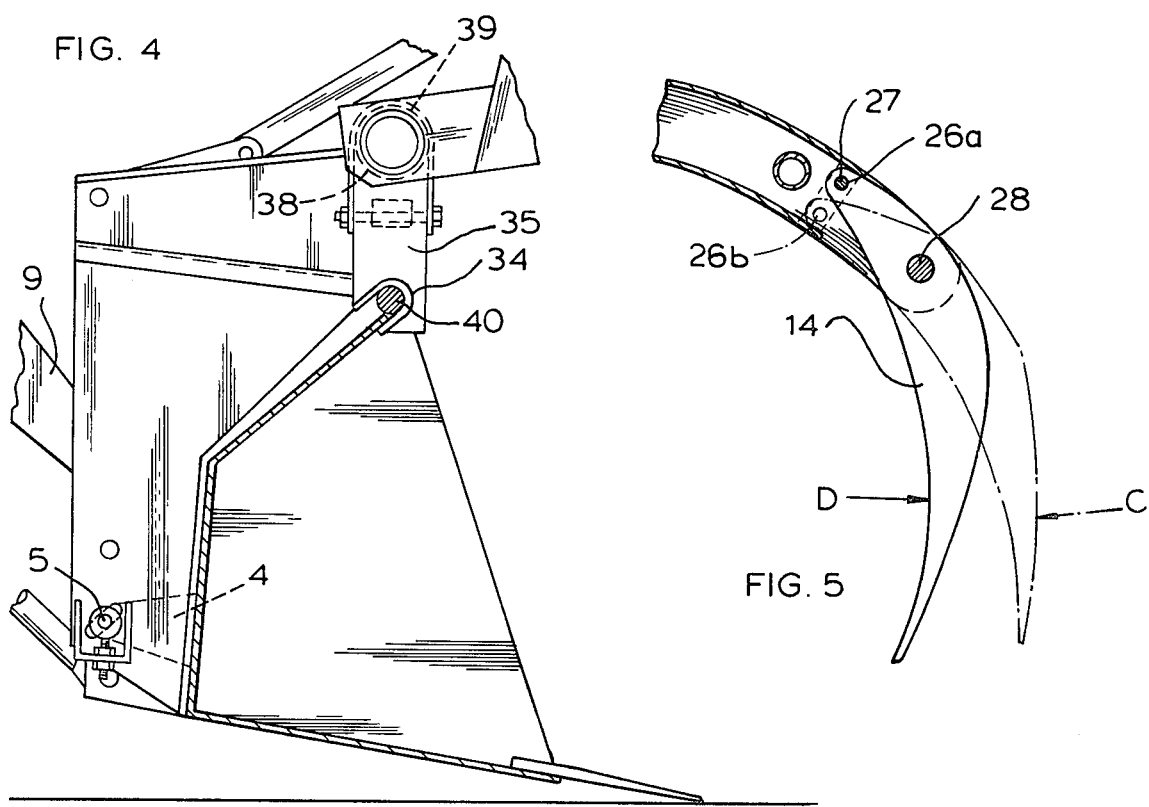
FIG. 4
FIG. 5

GRAPPLE SYSTEM

BACKGROUND OF THE INVENTION

It has been known to provide a grapple attachment for the buckets of loader tractors. Such grapplers typically comprise a plurality of fork-like teeth which swing down towards an open mouth of the bucket to either trap a load into or against a mouth of the bucket or to penetrate the load. For example, bales of hay may either be retained against a mouth of the bucket or in some prior art designs, the teeth of the bucket will penetrate the bale of hay.

In previous designs, the actuating mechanism for swinging the grapple down towards the bucket for engagement of a load typically had a fixed ratio between force and resistance arms. With such a mechanism, the pivot structure attaching the grapple to the bucket is subjected to large resisting forces requiring very large and heavy members and massive bearing systems.

In another method of actuating a grappling mechanism, a direct linkage is provided between a fixed point and the moveable grapple frame by use of an extendible power unit such as a hydraulic cylinder. The resultant force applied to the moveable grapple is quite small because the lever arm is very short and decreases as the grapple is closed.

In previous grapple designs, the grapple attachment to the loaders is either time-consuming or, if the attachment system is too simple, then large stresses develop at the attachment points which create product failure.

SUMMARY OF THE INVENTION

It is an object of this invention to provide a grapple system having an actuating mechanism wherein the force supplied by a hydraulic extension cylinder is more directly transferred to the grapple teeth in an open position, and for a load engagement closed position, the force supplied by the cylinder results in relatively large forces applied to the grapple teeth.

It is a further object of this invention to provide an actuating mechanism for a grapple tooth frame wherein the forces generated are contained within a common structure connected to the grapple frame without such forces also being transmitted to the bucket.

It is another object of this invention to provide a grapple system which is useful for either surrounding and entrapping a load against the mouth of a bucket or penetrating the load with the grapple teeth.

It is another object of this invention to provide a simplified attachment of a grapple tooth system to a bucket so as to minimize time and effort in attaching the same while still retaining sufficient strength to prevent failure or movement of either the bucket or the grapple system during operation relative to one another.

In accordance with the invention, a grapple system is provided having a grapple tooth frame formed of a plurality of grapple teeth extending in fork-like fashion from a hinge member permitting swinging movement of the grapple tooth frame. A grapple linkage housing connected to the grapple tooth frame by the hinge member has mounted therein a first and second pivotally series connected linkages. The free end of the first linkage connects to a crank arm on the grapple tooth frame and the free end of the second linkage pivotally connects at a first fixed point in the linkage housing. One end of a hydraulic extension member pivotally connects between the first and second linkages and its other end pivotally connects to a second fixed point within the linkage housing.

In an open position of the grapple, the hydraulic cylinder or extension member is closed or withdrawn and the first linkage forms nearly a straight line with the hydraulic cylinder. In a closed or load engagement position, the first and second linkages approach a straight line and mechanical leverage becomes great.

Additionally, with the invention an outer portion of the teeth are adjustable so as to selectively position these portions of the teeth to either penetrate or clamp loose loads such as hay.

Since all actuating forces of the grapple mechanism are contained within a common linkage housing, a great structural integrity results.

Finally, the attachment of the grapple system to the tractor bucket according to the invention is greatly simplified and requires only the seating of the grapple system on the bucket and the engagement of a single pin. Furthermore, a seating mechanism is provided so that interacting forces between the bucket and grapple system are spread over a large area.

BRIEF DESCRIPTION OF THE DRAWINGS

FIG. 3 is a cross-sectional view taken along line III—III of FIG. 2 and also exemplifies the relationships between linkage elements and a hydraulic cylinder of an actuating mechanism for the grapple system;

FIG. 4 is a cross-sectional view taken along line IV—IV of FIG. 2 and shows attachment of the grapple system to a bucket; and FIG. 5 is a cross-sectional view taken along line V—V of FIG. 2 and illustrates alternate positioning of a movable portion of the grapple teeth.

DESCRIPTION OF THE PREFERRED EMBODIMENTS

Figure 1:
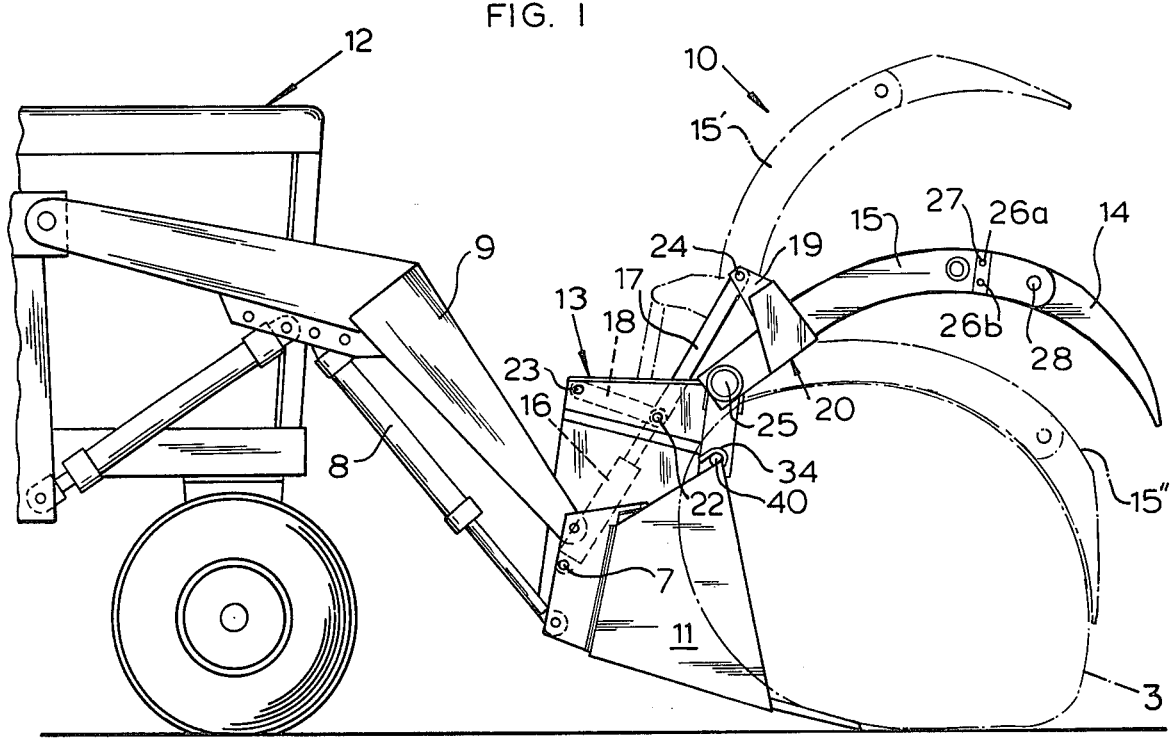
FIG. 1 is a side view of the improved grapple system of this invention as employed in conjunction with the bucket of a loader tractor.

As generally shown at 10 in FIG. 1, a grapple system is provided mounted on the bucket 11 of a loader tractor 12. The grapple system includes a grapple linkage housing 13 and a grapple tooth frame generally indicated at 20. The housing and frame are interconnected by a hinge system discussed hereafter.

Typically, the bucket 11 connects by loading arms 9 connecting with the tractor 12 and wherein a hydraulic cylinder 8 provides for bucket positioning adjustments.

It is desirable to rotate the grapple tooth frame 20 about a horizontal axis so as to selectively position the grapple teeth either in a fully open position shown at 15', an intermediate position shown at 15, or a load compressing position as shown at 15" wherein a load such as a bale of hay 3 is compressed against an open portion of the bucket 11. Also, with the invention as described hereafter, an adjustable tooth portion 14 is provided at the ends of the grapple teeth so as to selectively provide either load entrapment or load penetration by the teeth.

The grapple linkage housing 13 has mounted therein (FIG. 3) first and second pivotably and series connected linkages 17 and 18. Between the first and second linkages one end of a hydraulic cylinder 16 is pivotably connected. The free end of the first linkage 17 connects to a crank arm 19 mounted on the grapple tooth frame 20. A pivot pin 24 is provided for this purpose. The free end of the second linkage 18 connects by a pivot pin 23 at an upper left-hand corner of the linkage housing 13 as shown in FIG. 1. A pivot pin 7 connects the free end of the hydraulic cylinder near a lower left-hand portion of the housing 13 as shown in FIG. 1. Finally, a pivot pin 22 is provided at the junction between the first and second linkage elements and the hydraulic cylinder.

As noted previously, each of the teeth 15 has an adjustable portion 14 as shown in FIG. 1 but more clearly shown in FIG. 5. A pivot pin 28 connects the adjustable portion 14 to the teeth 15 and shear pin apertures 26a, b, either of which receive a shear pin 27, provide for a two-position adjustment of the adjustable tooth portion 14.

Figure 2:
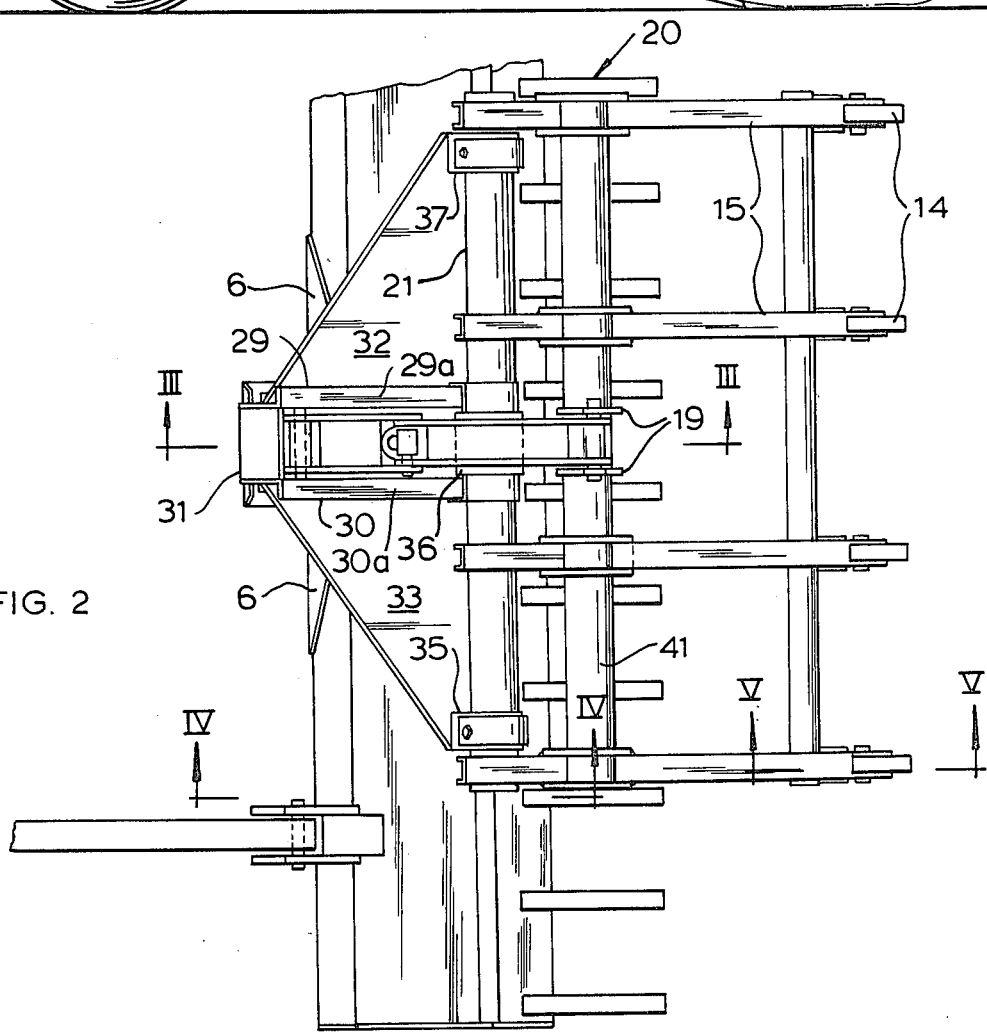
FIG. 2 is a top view of the grapple system of the invention.

The detailed structure of the grapple linkage housing 13 is more clearly shown in FIGS. 2 and 3. Parallel side plates or sidewalls 29 and 30 are provided together with an end wall 31 cooperating with the parallel sidewalls 29 and 30 to provide a U-shaped frame or housing. Triangular sidewall support plates 32 and 33 are provided at right angles to the plane faces of each of the sidewalls 29 and 30. An upper lip 29a, or 30a is provided at the top of each of the sidewalls. An abutment plate 6 is positioned along one edge and perpendicular to the sidewalls so as to abut against a rear portion of the bucket 11 when the grapple system is in place. The linkage housing 13 also has a U-shaped support bar 34 which seats against a seating rod 40 welded on the bucket. With the grapple linkage housing thus in place, an attachment pin 5 is then provided which engages a grapple frame attachment bracket 4 extending out from a rear of portion 11a of the bucket 11.

As shown in FIG. 2, the grapple tooth frame 20 includes a plurality of parallel teeth 15 connected together at an intermediate point by a support bar 41 to which the crank arm 19 is attached. The attachment ends of the teeth 15 connect with a cylindrical pivot tube 21.

The various components of the hinge connection system between the grapple linkage housing 13 and the grapple tooth frame 20 will now be described. Three mounting posts 35, 36 and 37 are provided along the U-shaped seating member 34 at the top of the housing 13. The upper end of each of these mounting posts has a curved saddle 38 in which the pivot tube 25 of the grapple tooth frame 20 rests. A U-shaped attachment member 39 bolts over the pivot tube 25 at each post and cooperates with each curved saddle 38 to form a split bearing collar enclosing the pivot tube in freely rotatable fashion.

As most clearly shown in FIG. 4, the pre-assembled linkage housing 13 with hingeably attached tooth frame 20 releaseably attaches to the bucket in the following manner. A seating rod 40 welded on the top edge of the bucket provides a large area weight bearing surface around which a U-shaped seating member 34 engages. This U-shaped seating member 34 is firmly attached along a top edge of the linkage housing 13. When the grapple linkage housing and attached tooth frame are placed on the bucket so that the seating member engages the seating rod, a locking pin 5 is then inserted as shown in FIG. 4. This results in a simple grapple attachment to the bucket by a single step yet with a structure which provides large weight bearing surfaces along the seating rod 40.

Operation of the grapple system of this invention will now be described both with respect to FIGS. 3 and 5. As shown in FIG. 3, in the open position of the grapple frame at 15', the hydraulic cylinder 16 is withdrawn. The first pivoting arm 17 forms nearly a straight line with the hydraulic cylinder. As the hydraulic cylinder is extended or lengthened, the grapple fork frame closes and the first and second linkages approach a straight line since the pivot point 23 of the arm 18 lies rearwardly of the pivot point 22. Consequently, mechanical leverage becomes very great at the very time when such leverage is most desireable, that is when the load is being compressed or clamped. Similarly when the grapple fork is open, the in-line arrangement of the hydraulic cylinder and linkage 17 provides maximum pulling force in this position.

Consequently, with the invention an increased penetrating or clamping force is provided. Also, the pivot points are subjected only to those forces directly acting.

By equipping the tooth frame 20 with pivotally mounted teeth portions, the teeth may be selectively positioned to either engulf an average sized round bale and clamp it for transportion or in another position the teeth may dig or penetrate into the bale as needed for breaking out silage or clamping loose hay. The pins used to position the teeth also provide protection for the teeth in the tooth frame and hinge system by shearing when exposed to excessive loads.

With the invention, all actuating forces for moving the grapple are contained within the grapple housing. The two pivoting arms and the hydraulic cylinder together with the hinge system contain all actuating forces within the grapple structure and reduces the probability of damaging a bucket.

With the invention the attachment of the grapple to the bucket is made in such fashion that resultant forces of bucket or grapple functions do not cause failure to either mechanism.

The clamping system for engaging the grapple on the bucket distributes the interacting forces over a long section of the bucket and grapple, thereby reducing unit stress and the possibility of component failure.

It will be understood that variations and modifications may be effected without departing from the spirit and scope of the novel concepts of this invention.

I claim as my invention:

1. A grapple system for mounting on a tractor bucket, comprising:
   (a) a grapple tooth frame including a plurality of grapple teeth extending in fork-like fashion from a hinge means for swinging movement of the grapple tooth frame and a crank arm connected to the frame;
   (b) a grapple linkage housing connected to the grapple tooth frame by the hinge means;
   (c) the linkage housing having mounted thereon first and second pivotally series connected linkages and a hydraulic driving member having one end pivotally connected at the pivotal junction between the first and second linkages and its other end pivotally connected at a first point to the linkage housing, the free end of the first linkage pivotally connecting to the crank arm and the free end of the second linkage pivotally connecting to the linkage housing at a second point, the first and second points and relative lengths of the first and second linkages and hydraulic driving member being chosen such that with the grapple tooth frame in an open position the hydraulic driving member and first linkage are approximately in line and with the tooth frame in a closed load engagement position the first and second linkages are approaching an in-line configuration.

2. A system according to claim 1 wherein outer ends of the grapple teeth are pivotally mounted and a position fixing means is provided for fixing the outer ends in at least two different positions.

3. A system according to claim 2 wherein a pivot pin is provided and said position fixing means comprises a shear pin.

4. A grapple system according to claim 1 wherein the grapple tooth frame, hinge means, and grapple linkage housing comprise a pre-assembly which is mounted on the bucket by a seating member connected to the grapple tooth frame seated over an upper edge of the bucket and no more than one further grapple system attachment member between the grapple linkage housing and the bucket.

5. A grapple system according to claim 4 wherein a seating rod is provided on the bucket and the seating member comprises a U-shaped bracket mounted to the linkage housing.

6. A grapple system according to claim 1 wherein the grapple tooth frame further comprises a support bar connecting the teeth and parallel to and spaced from a cylindrical pivot tube forming a portion of the hinge means, and said crank arm is mounted to said support bar.

7. A grapple system according to claim 1 wherein the hinge means comprises a cylindrical pivot tube from which the teeth extend in fork-like fashion, and a plurality of split bearing collars surrounding the pivot tube and connecting to the grapple linkage housing.

8. A grapple system according to claim 1 wherein the grapple linkage housing comprises first and second spaced parallel sidewall plates and an attached bucket abutment plate perpendicular to the sidewall plates.

9. The system of claim 8 wherein triangular sidewall support plates are connected perpendicular to the sidewall plates.

10. A grapple system, comprising:
a tractor bucket; a grapple tooth frame formed of a plurality of grapple teeth extending in fork-like fashion from a hinge means for relative swinging movement of the tooth frame relative to the bucket; and grapple tooth actuating means for swinging the grapple teeth towards the bucket for engagement with a load, the actuating means comprising first and second series connected linkages, the first linkage extending from a pivoting connection on the grapple tooth frame and the second linkage from a pivoting connection at a first point whose position is fixed relative to the bucket, a hydraulic extending member pivotally connecting between a pivoting connection between the first and second linkages and a second point whose position is fixed relative to the first point, and said first point position being rearwardly of the pivoting connection between the first and second linkage relative to the bucket.

11. The system of claim 10 in which in an open position of the grapple tooth frame, the first linkage lies substantially along a same line as the hydraulic extending member, and in a second closed position when the grapple teeth retain a load, the first and second linkages are substantially in an in-line configuration.

12. The system of claim 10 wherein the grapple tooth frame and grapple tooth actuating means mount on the bucket by seating means releasably engaging at a lip of the bucket and a removable pin retaining member connecting to the seating means.

13. A grapple system removeably mountable on a tractor bucket, comprising:
a grapple tooth frame formed of a plurality of grapple teeth extending in fork-like fashion from a hinge means for swinging movement of the grapple tooth frame, and a crank arm connected to the frame;
a grapple linkage housing connected to the grapple tooth frame by the hinge means;
a linkage housing comprising first and second sidewall plates between which are positioned first and second pivotally and series connected linkages and a hydraulic extension element having one end pivotally connected at the pivotal junction between the first and second linkages, a free end of the first linkage connecting to the crank arm in pivotal fashion, a free end of the second linkage connecting by a pivot pin between the two sidewall plates;
a free end of the hydraulic extension member connecting by a pivot pin between the sidewall plates; and
means for seating the linkage housing in weight bearing abutment at an upper edge of the tractor bucket and a pin means for securing the linkage housing in position such that a portion of the linkage housing abuts against a rear portion of the tractor bucket.

* * * * *